United States Patent
Morrison et al.

(10) Patent No.: US 6,746,755 B2
(45) Date of Patent: Jun. 8, 2004

(54) CERAMIC MATRIX COMPOSITE STRUCTURE HAVING INTEGRAL COOLING PASSAGES AND METHOD OF MANUFACTURE

(75) Inventors: Jay Morrison, Oviedo, FL (US); Steven C. Butner, Powey, CA (US); Christian X. Campbell, Orlando, FL (US); Harry A. Albrecht, Hobe Sound, FL (US); Yevgeuiy Shteyman, West Palm Beach, FL (US)

(73) Assignee: Siemens Westinghouse Power Corporation, Orlando, FL (US)

( * ) Notice: Subject to any disclaimer, the term of this patent is extended or adjusted under 35 U.S.C. 154(b) by 0 days.

(21) Appl. No.: 09/962,733

(22) Filed: Sep. 24, 2001

(65) Prior Publication Data

US 2003/0059577 A1 Mar. 27, 2003

(51) Int. Cl.⁷ .............................. B32B 3/00; B32B 3/20; B32B 1/00; B32B 3/12; B64C 5/00
(52) U.S. Cl. ................... 428/166; 428/178; 428/188; 244/123; 244/124; 244/133
(58) Field of Search ................. 428/178, 188, 428/166; 244/123, 124, 133

(56) References Cited

U.S. PATENT DOCUMENTS

| | | | |
|---|---|---|---|
| 2,506,244 A | 5/1950 | Stopka | |
| 3,892,612 A | * 7/1975 | Carlson et al. | 156/150 |
| 3,943,980 A | * 3/1976 | Rheaume | 139/384 R |
| 4,289,719 A | 9/1981 | McIntosh et al. | 264/61 |
| 4,617,072 A | * 10/1986 | Merz | 156/89.25 |
| 4,814,029 A | 3/1989 | Butcher | 156/89 |
| 4,822,660 A | * 4/1989 | Lipp | 428/113 |
| 5,139,716 A | 8/1992 | Wrona et al. | |
| 5,331,816 A | 7/1994 | Able et al. | 60/753 |
| 5,350,545 A | 9/1994 | Streckert et al. | 264/29.1 |
| 5,372,868 A | * 12/1994 | Prewo et al. | 428/167 |
| 5,455,106 A | 10/1995 | Steffier | 428/229 |
| 5,547,737 A | * 8/1996 | Evans et al. | 428/178 |
| 5,657,729 A | 8/1997 | Atmur et al. | 428/446 |
| 5,779,833 A | 7/1998 | Cawley et al. | 156/89.11 |
| 5,866,244 A | 2/1999 | Jessen | 428/293.4 |
| 5,902,756 A | 5/1999 | Aly et al. | 442/239 |
| 5,916,510 A | 6/1999 | Jessen | 264/610 |
| 6,025,048 A | 2/2000 | Cutler et al. | 428/105 |
| 6,033,619 A | 3/2000 | Hattori | 264/629 |
| 6,041,496 A | 3/2000 | Haq et al. | 29/852 |
| 6,048,432 A | 4/2000 | Ecer | 156/263 |
| 6,080,343 A | 6/2000 | Kaufman et al. | 264/40.5 |
| 6,197,424 B1 | 3/2001 | Morrison et al. | 428/402 |
| 6,241,471 B1 | 6/2001 | Herron | 415/190 |
| 6,265,078 B1 | 7/2001 | Atmur et al. | 123/193.5 |
| 6,451,416 B1 | * 9/2002 | Holowczak et al. | 428/293.4 |

* cited by examiner

*Primary Examiner*—Harold Pyon
*Assistant Examiner*—Catherine Ann Simone

(57) ABSTRACT

A multi-layer ceramic matrix composite structure (40) having a plurality of fiber-reinforced cooling passages (42) formed therein. The cooling passages are formed by the removal of a fugitive material (24). The fugitive material is part of a wrapped fugitive material structure (28) containing a layer of reinforcing ceramic fibers (26) that is used to lay-up the multi-layer structure. An intermediate layer of ceramic fabric 56 may be placed alternately over and under the wrapped fugitive material structure to separate the cooling passages into alternating upper (54) and lower (52) cooling passages. The transversely oriented fibers surrounding the cooling passages serve to increase the interlaminar strength of the structure when compared to prior art designs. An airfoil member (112) incorporating such reinforced integral cooling passages (120) is provided.

10 Claims, 4 Drawing Sheets

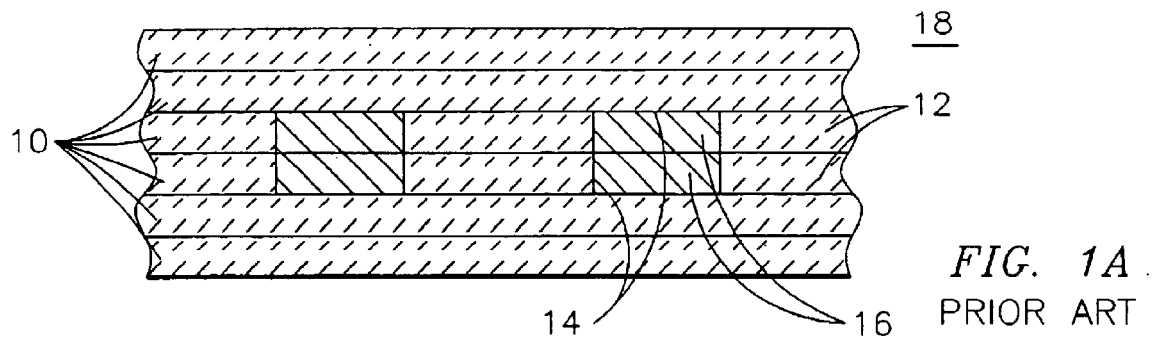
FIG. 1A PRIOR ART
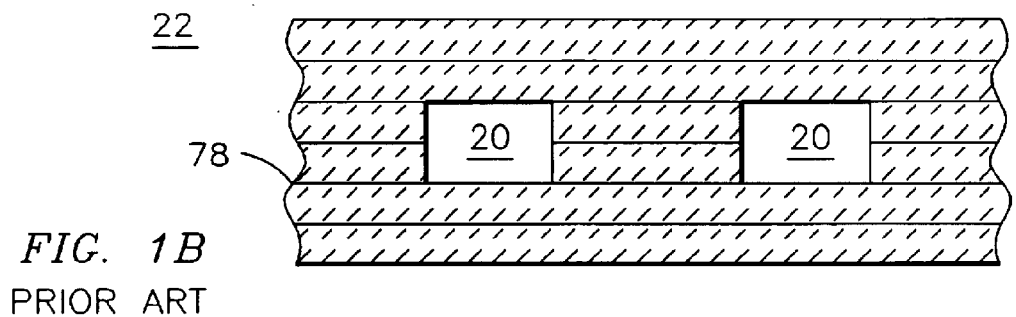
FIG. 1B PRIOR ART
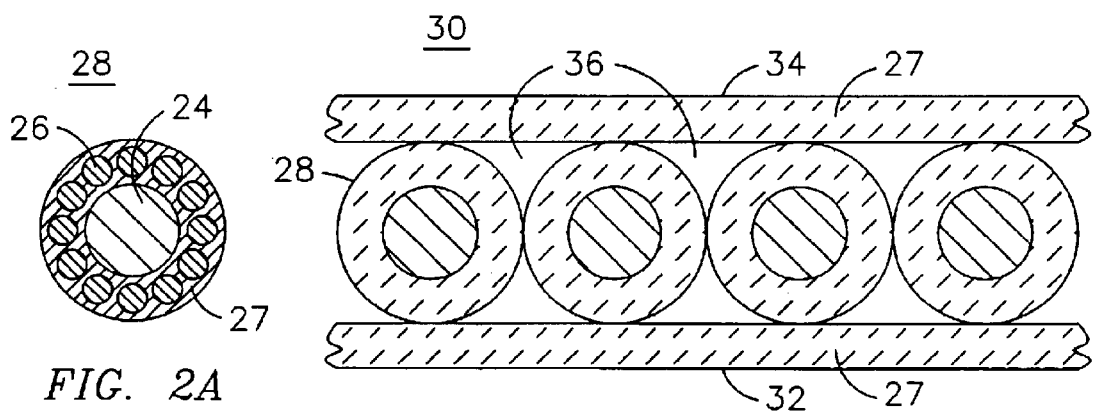
FIG. 2A
FIG. 2B
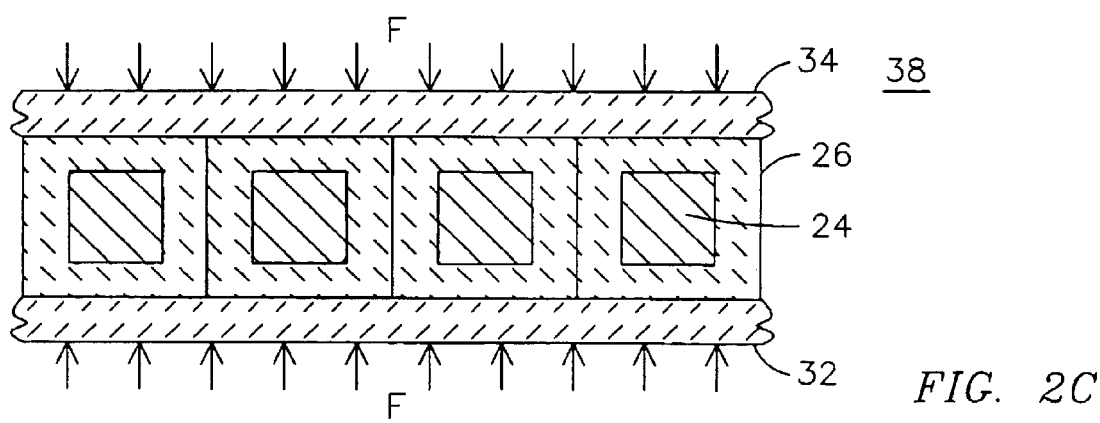
FIG. 2C

CERAMIC MATRIX COMPOSITE STRUCTURE HAVING INTEGRAL COOLING PASSAGES AND METHOD OF MANUFACTURE

FIELD OF THE INVENTION

The present invention relates generally to ceramic matrix composite structures, and more particularly to a ceramic matrix composite component having integral cooling passages formed therein.

BACKGROUND OF THE INVENTION

Combustion turbines are well known in the art as having a compressor section for supplying a flow of compressed combustion air, a combustor section for burning a fuel in the compressed combustion air, and a turbine section for extracting thermal energy from the combustion air and converting that energy into mechanical energy in the form of a shaft rotation. Many parts of the combustor section and turbine section are exposed directly to the hot combustion gasses, for example the combustor, the transition duct between the combustor and the turbine section, and the turbine stationary vanes, rotating blades and surrounding ring segments.

It is also known that the power and efficiency of a combustion turbine may be increased by increasing the firing temperature of the combustion gas. Modern, high efficiency combustion turbines may have firing temperatures in excess of 1,600° C., which is well in excess of the safe operating temperature of the structural materials used to fabricate the hot gas flow path components. Accordingly, several methods have been developed to provide cooling for such components, including film cooling, back-side cooling and insulation.

Film cooling involves the delivery of a film of cooling fluid, such as compressed air extracted from the compressor section, between the structural component and the flow of hot combustion gasses. The film of cooling fluid may be provided through holes formed in the surface of the component which are in fluid communication with the compressor section. Film cooling systems are generally very effective in cooling a component, however they may significantly reduce the efficiency of the machine. Energy is needed to compress the cooling fluid, a decrease in combustion gas temperature is induced by the addition of the relatively cold fluid, and disturbance may be created in the smooth flow of air over an airfoil component such as a blade or vane.

Back-side cooling generally involves the passage of a cooling fluid over a back side of a component that has a front side exposed to the hot combustion gasses. The cooling fluid in back-side cooling schemes may be compressed air that has been extracted from the compressor or steam that is available from other fluid loops in a combustion turbine power plant. Back-side cooling does not affect the exhaust gas composition or the flow of air over an airfoil component, it does not dilute the hot combustion air with colder fluid, and it can generally be supplied at a lower pressure than would be needed for film cooling. However, back-side cooling creates a temperature gradient across the thickness of the cooled wall, and thus becomes decreasingly effective as the thickness of the component wall increases and as the thermal conductivity of the material decreases.

Finally, insulation materials, such as ceramic thermal barrier coatings (TBC's), have been developed for protecting temperature-limited components. While TBC's are generally effective in affording protection for the current generation of combustion turbine machines, they may be limited in their ability to protect underlying metal components as the required firing temperatures for next-generation turbines continue to rise.

Ceramic matrix composite (CMC) materials offer the potential for higher operating temperatures than do metal alloy materials due to the inherent nature of ceramic materials. This capability may be translated into a reduced cooling requirement which, in turn, may result in higher power, greater efficiency, and/or reduced emissions from the machine. However, CMC materials generally are not as strong as metal, and therefore the required cross-section for a particular application may be relatively thick. Due to the low coefficient of thermal conductivity of CMC materials and the relatively thick cross-section necessary for many applications, back side closed loop cooling is generally ineffective as a cooling technique for protecting these materials in combustion turbine applications. Accordingly, a high temperature insulation for ceramic matrix composites has been described in U.S. Pat. No. 6,197,424 B1, which issued on Mar. 6, 2001, and is commonly assigned with the present invention. That patent describes an oxide-based insulation system for a ceramic matrix composite substrate that is dimensionally and chemically stable at a temperature of approximately 1600° C. However, even higher operating temperatures are envisioned for future generations of combustion turbine machines. Accordingly, an improved method of cooling a ceramic matrix composite material is needed. Furthermore, a ceramic matrix composite material capable of operating at temperatures in excess of 1600° C. is needed.

SUMMARY OF THE INVENTION

A multi-layer ceramic matrix composite structure is disclosed herein to have a top layer of ceramic matrix composite material; a bottom layer of ceramic matrix composite material; and an intermediate layer of ceramic matrix composite material joining the top layer and the bottom layer, the intermediate layer including a plurality of adjoining hollow ceramic matrix composite structures, each hollow ceramic matrix composite structure in integral contact with the top layer, the bottom layer and respective adjoining hollow ceramic matrix composite structures, the hollow ceramic matrix composite structures defining a respective plurality of cooling passages through the multi-layer ceramic matrix composite structure. Reinforcing fibers in the hollow ceramic matrix composite structures may be oriented circumferentially, longitudinally or in a spiral configuration, thereby providing additional strength to the structure in the region surrounding the cooling passages.

A method of fabrication is described herein as including the steps of: providing a bottom layer of ceramic fiber material; wrapping ceramic fiber material around a fugitive material to form a plurality of ceramic fiber wrapped fugitive material structures; disposing the plurality of ceramic fiber wrapped fugitive material structures on the bottom layer; disposing a top layer of ceramic fiber material over the plurality of ceramic fiber wrapped fugitive material structures to form a layered structure; impregnating the layered structure with a ceramic matrix precursor material; and applying a compressive force and heat to the impregnated structure to eliminate voids in the impregnated structure by deforming the fugitive material structures and to dry and cure the matrix precursor material to form a green body structure. Further steps may include heating the green body structure to a temperature sufficiently high to remove the fugitive material to form a plurality of cooling passages.

In a further embodiment, a multi-layer ceramic matrix composite structure is described as including: a top layer of ceramic matrix composite material; a bottom layer of ceramic matrix composite material; a plurality of hollow ceramic matrix composite structures; and an intermediate layer of ceramic matrix composite material disposed between the top layer and the bottom layer; the intermediate layer having a generally serpentine cross-sectional shape disposed alternately over and under adjacent ones of the plurality of hollow ceramic matrix composite structures.

In a further embodiment, a multi-layer ceramic matrix composite structure is described as including: a top layer of ceramic matrix composite material; a bottom layer of ceramic matrix composite material; a plurality of hollow ceramic matrix composite structures; and an intermediate layer of ceramic matrix composite material disposed between the top layer and the bottom layer; the intermediate layer having a generally serpentine cross-sectional shape disposed alternately over and under adjacent ones of the plurality of hollow ceramic matrix composite structures.

A further method of fabricating is described as including: providing a plurality of pins formed of a fugitive material; weaving a mat of ceramic fibers around the plurality of pins of fugitive material; impregnating the mat with a matrix precursor material; drying and curing the matrix precursor material; and removing the fugitive material to form a plurality of passages through the mat. The method may further include wrapping each of the plurality of pins with ceramic fibers prior to the step of weaving.

Another embodiment is further described as including: a multi-layer ceramic matrix composite material; a layer of ceramic thermal barrier coating material disposed on the multi-layer ceramic matrix composite material; and a cooling passage formed in the multi-layer ceramic matrix composite material, the cooling passage having a longitudinal axis extending in a direction generally parallel to a plane of a layer of the multi-layer ceramic matrix composite material, the cooling passage bounded by a layer of ceramic matrix composite material having fibers disposed around the longitudinal axis.

BRIEF DESCRIPTION OF THE DRAWINGS

FIG. 1A partial cross-sectional view of a prior art laminated CMC structure having a fugitive material inserted into two of the layers of fabric material.

FIG. 1B is the structure of FIG. 1A after the fugitive material has been removed, leaving a cooling passage through the laminated structure.

FIG. 2A is a cross-sectional view of a generally cylindrical-shaped section of fugitive material wrapped with a ceramic fiber.

FIG. 2B is a cross-sectional view of the wrapped structure of FIG. 2A laid into a laminar structure between two layers of ceramic fabric.

FIG. 2C is a cross-sectional view of the structure of FIG. 2A after it has been subjected to a pressure-assisted curing process.

DETAILED DESCRIPTION OF THE INVENTION

Figure 2D:
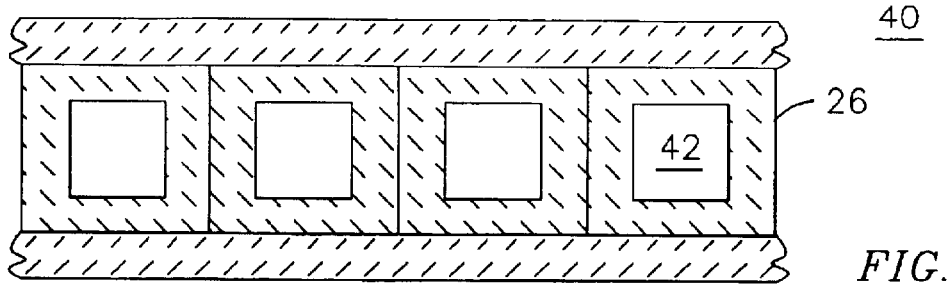
FIG. 2D is a cross-sectional view of the structure of FIG. 2C after it has undergone high temperature firing so that fugitive material has been removed leaving cooling passages through the structure.

Fugitive materials have been used to create voids or passages in a variety of applications, including laminated ceramic matrix composite materials. FIGS. 1A and 1B illustrate one such application, where a plurality of layers of fabric 10, dry or pre-impregnated with a matrix precursor, are layered one upon another. Two of these layers 12 are cut to form a channel 14 where a fugitive material 16 is then disposed. Additional layers 10 of un-cut fabric are then laid up to achieve a desired thickness. The dry fabric layers are then impregnated with a matrix material and the composite structure is then dried and cured, with or without pressure assistance, using processes that are well known in the art to form green body structure 18. The drying and curing steps are done at a temperature below the stability point for the fugitive material 16. The green body structure 18 is then heated to a temperature sufficiently high to remove the fugitive material 16 to form passage 20, and further to fire the CMC structure 22 to its final density. This process is limited to forming passages having a height dimension that is a multiple of the thickness of the fabric layer 10. Furthermore, such a structure is inherently weakened by the presence of passage 20, particularly along the plane of the bond between the cut and the uncut layers, making the structure 22 more susceptible to interlaminar failure. Structural forces as well as pressure forces created by pressurized cooling fluid within the passages 20 create loads on the material. The stress concentration created by any of the corners of passage 20 results in a peak stress value directly at an interface between two of the layers of fabric 10. A crack forming in this area will tend to progress between layers 10 and will result in the interlaminar failure of the structure 22. The growth of such an interlaminar crack is not impeded by the presence of the fibers of either bounding layer.

An improved ceramic composite structure and method of forming the same is illustrated in FIGS. 2A–2D. FIG. 2A shows a cross-section of a fugitive material having a generally cylindrical shape 24 that has been wound or wrapped with ceramic fibers 26. The fugitive material cross-sectional shape may be round, as illustrated, or any other desired shape, and may be hollow or solid. The fugitive material 24 may be polyester or PTFE or other material having a stability temperature sufficiently high to withstand the drying/curing of a surrounding matrix material, yet low enough so that the fugitive material is vacated from the structure when the structure is fired to its final density or is otherwise heated to a temperature higher than the drying/curing temperature. The fibers 26 may be an oxide ceramic, such as materials available from the Minnesota Mining and Manufacturing Company under the trademark Nextel, including Nextel 720 (alumino-silicate), Nextel 610 (alumina), and Nextel 650 (alumina and zirconia). The fibers 26 may alternatively be a non-oxide ceramic, such as silicon carbide available from Dow Corning Corporation under the trademark Sylramic or from the Nippon Carbon Corporation Limited under the trademark Nicalon. The fibers 26 may be in the form of fabric or filament wound around core 24. The fibers may be oriented in a direction generally parallel to a longitudinal axis of the core 24 or generally circumferential to the longitudinal axis. The fibers 26 may be wrapped in a dry state or pre-impregnated with a matrix precursor 27, such as alumina, mullite, alumino-silicate, silicon carbide or silicon nitride. The final fiber-wrapped fugitive material structure 28 is then used to form a layered structure 30, as illustrated in cross-section in FIG. 2B. One or more fiber-wrapped fugitive material structures 28 are disposed on one or more bottom layers of fibrous ceramic material 32. Here, again, the bottom layers 32 may be laid up in a dry state or may be pre-impregnated with a matrix precursor 27. The fiber layers 32 and matrix material may be any of the materials described above with respect to the fiber-wrapped fugitive material structure 28. One or more top layers of fibrous ceramic material 34 are then disposed over the fiber-wrapped fugitive material structures 28 to form the layered structure 30. The top layers of fibrous ceramic material 34 are preferably selected to be the same type of material with or without a pre-impregnated matrix precursor 27 as is used for bottom layers 32. Note that in this pre-cured condition, structure 30 will have a plurality of voids 36 existing between the fiber-wrapped fugitive material structures 28 and the top and bottom layers of fibrous ceramic material 32, 34.

A matrix precursor material 27 is impregnated into the structure if fibers without pre-impregnated matrix precursor were used. The layered structure 30 of FIG. 2B is then subjected to a pressure-assisted curing process to dry and to cure the matrix material 27 to form the green-body cured structure 38, illustrated in cross-section in FIG. 2C. The curing process may be an autoclave curing process and/or a vacuum bagging process as widely used for polymer material composites. Note that as the structure is subjected to compressive force F during the curing process, the fugitive material 24 will deform so that voids 36 are eliminated in the cured structure 38. The pressure assisted curing process may be any known process in the art, and the compressive force F may be approximately 80 pounds per square inch, for example. Because fugitive material 24 is selected to be an incompressible but elastic material, its cross-sectional shape will be changed in response to compressive force F in order to achieve essentially complete contact between the fiber-wrapped fugitive material structures 28 and the top and bottom layers of fibrous ceramic material 32, 34 respectively, with no significant voids remaining there between. Note that the temperature used during this step is below a transition temperature of the fugitive material 24.

The cured structure 38 is then subjected to a higher temperature that is above a transition temperature for the fugitive material 24. This higher temperature may be achieved during a separate step or during the final firing of the green-body cured structure 38. The removal of the fugitive material results in the multi-layer ceramic structure 40 shown in cross-section in FIG. 2D. The fugitive material 24 has been oxidized or evaporated by a sufficiently high temperature so that it has been removed from the structure 40, leaving in its place voids or cooling channels 42. In the embodiment illustrated in FIGS. 2A–2D, the cooling channels 42 run along a length of the structure 40 with a generally linear shape, although other shapes may be envisioned by one skilled in the art. Advantageously, the fibers 26 that were originally wrapped around the fugitive material 24 are now disposed transversely around or parallel to the longitudinal axis of the cooling channels 42, thereby reinforcing the structure in this region of stress concentration. The intimate contact between adjacent layers of fibers 32, 28, 34, provided by the deformation of fugitive material 24 during the pressure-assisted curing process, ensures that the multi-layer structure 40 is fully bonded between layers in spite of the presence of cooling channels 42. The fibers26 disposed around the cooling channels 42 are advantageously oriented so as to resist the forces generated by pressurized cooling fluid present within the cooling channels 42. Furthermore, the portion of the fibers 26 that are oriented in a thru-thickness direction provide increased hot-side to cold-side thermal conductivity to the structure, thereby reducing the overall temperature gradient for any given heat flux. This effect will lower thermal stresses and reduce cooling air requirements.

Figure 3:
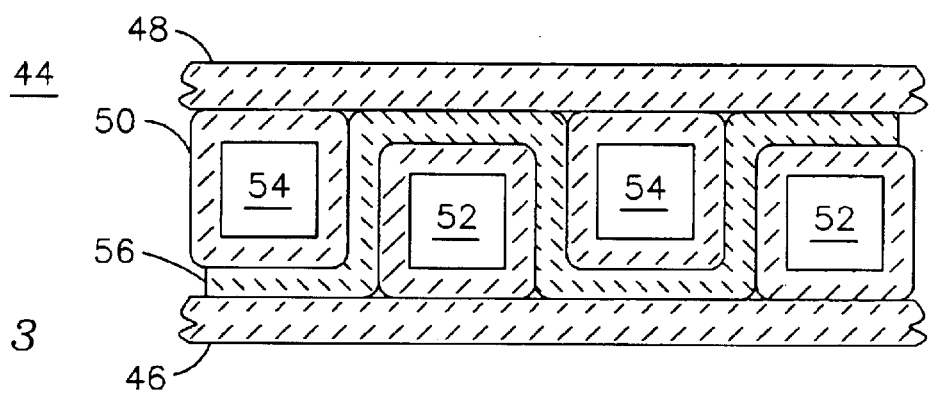
FIG. 3 is a cross-sectional view of a multi-layer ceramic matrix composite structure having a plurality of upper reinforced cooling channels interposed between and vertically displaced from a plurality of lower reinforced cooling channels.

FIG. 3 illustrates another embodiment of a multi-layer ceramic structure in accordance with the present invention. Multi-layer ceramic structure 44 includes a bottom layer of ceramic fiber matrix composite material 46, a top layer of ceramic fiber matrix composite material 48, a plurality of hollow ceramic fiber matrix structures 50 defining a respective plurality of voids or cooling channels 52, 54, and an intermediate layer of ceramic fiber matrix composite material 56. The intermediate layer of ceramic fiber matrix composite material 56 has a generally serpentine cross-sectional shape when viewed along a plane of the top layer 48 and bottom layer 46, as illustrated in FIG. 3. Structure 44 is formed by a process similar to that described with respect to FIGS. 2A–2D, except that the fiber-wrapped fugitive material structures 28 used to form hollow composite structures 50 are alternately disposed on top of and underneath intermediate layer 56 when the structure is laid up. In this manner, once the structure 44 is in its final fired state, the plurality of upper voids 54 are horizontally interspaced between and vertically displaced from the plurality of lower voids 52. The ceramic fibers contained within both the intermediate layer 56 and the wrapped fiber matrix composite structures 50 serve to mechanically strengthen the structure around cooling channels 52, 54.

Figure 4A:
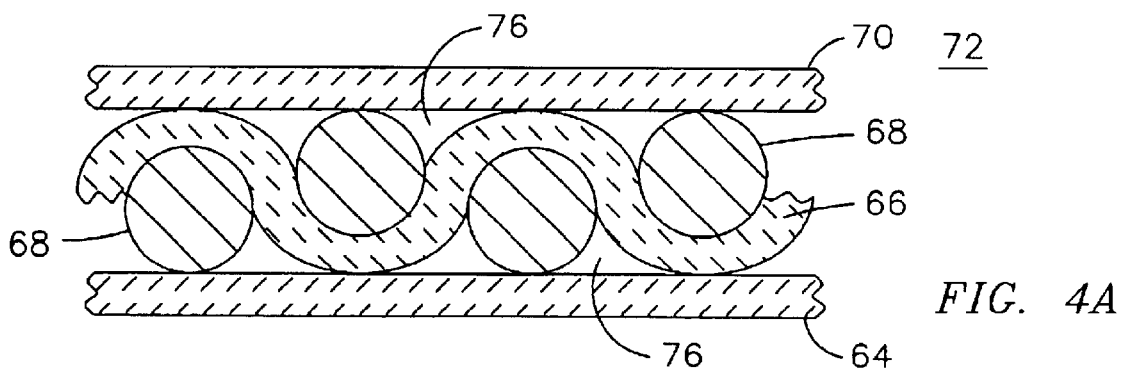
FIG. 4A is a partial cross-sectional view of a multi-layer composite structure wherein an intermediate layer of ceramic fiber material is weaved over and under a plurality of bars of fugitive material.
Figure 4B:
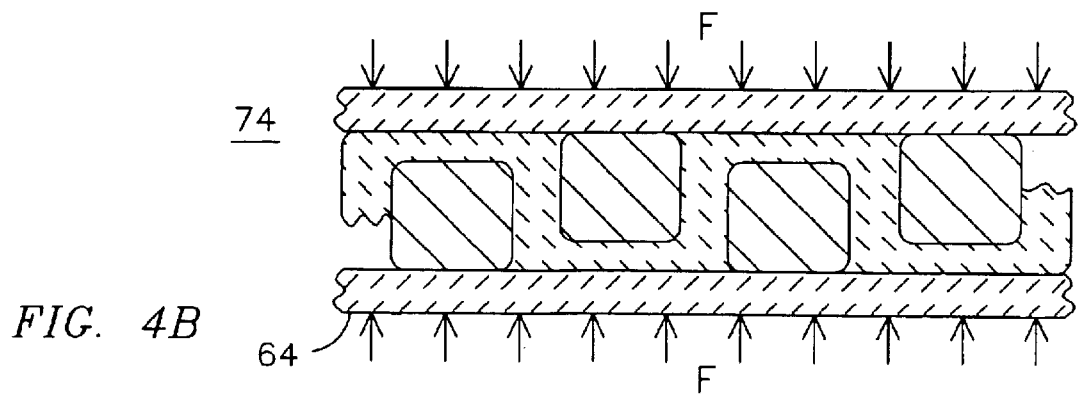
FIG. 4B is the structure of FIG. 4A as it is being subjected to a pressure-assisted drying/curing process.
Figure 4C:
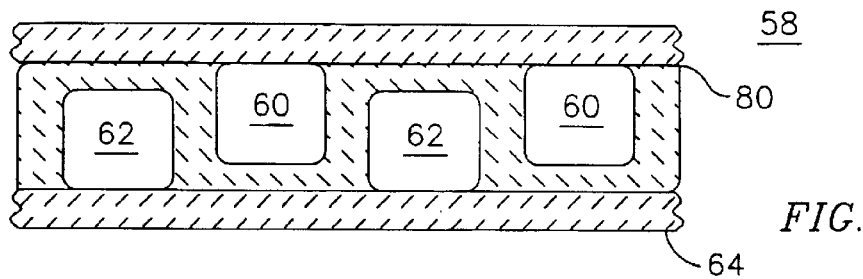
FIG. 4C is the structure of FIG. 4B after the fugitive material has been removed by burnout, with the former locations of the fugitive material becoming cooling channels running through the structure.

FIGS. 4A–4C illustrate the process steps used to form an alternative embodiment of a multi-layer ceramic matrix composite structure 58 having interspaced fiber-reinforced upper cooling channels 60 and lower cooling channels 62. At least one bottom layer of fiber material 64 is layered with at least one intermediate layer of fiber material 66 alternately weaved above and below a plurality of bars of fugitive material 68. A top layer of fiber material 70 is disposed above the intermediate layer 66 and fugitive material 68. As described with regard to FIGS. 2A–2D above, this layered structure 72 is subjected to a pressure-assisted drying/curing process wherein a compressive force F serves to deform the fugitive material 68 to substantially eliminate any voids 76 within the cured structure 74. The final fired multi-layered structure 58 is formed by thermally removing the fugitive material 68, as described above. The plurality of upper cooling channels 60 and lower cooling channels 62 within structure 58 are reinforced by the fibers within intermediate layer 66 that are aligned transverse to the plane of the layers 64, 70. Whereas in prior art structure 22 of FIG. 1B, each of the passages 20 creates a stress concentration and a reduction in bond area along the same bond line 78, in the multi-layer structure 58 of FIG. 4C, a given bond line 80 between adjacent layers 66, 70 is affected by only the upper cooling passages 60 but not the lower cooling passages 62. Accordingly, for any given number of cooling passages and with other variables held constant, the interlaminar strength of a structure having the form of multi-layer structure 58 will be higher than that of a prior art structure having the form of multi-layer structure 22.

Figure 5A:
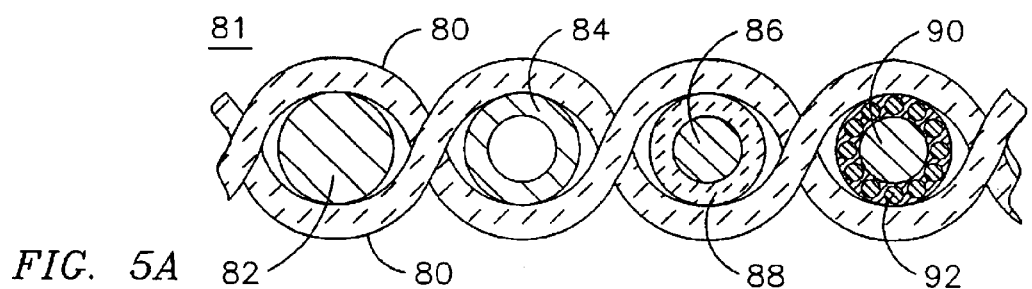
FIG. 5A illustrates a 3-D fiber structure weaved on pins formed from a variety of non-reinforced and fiber reinforced fugitive materials.
Figure 5B:
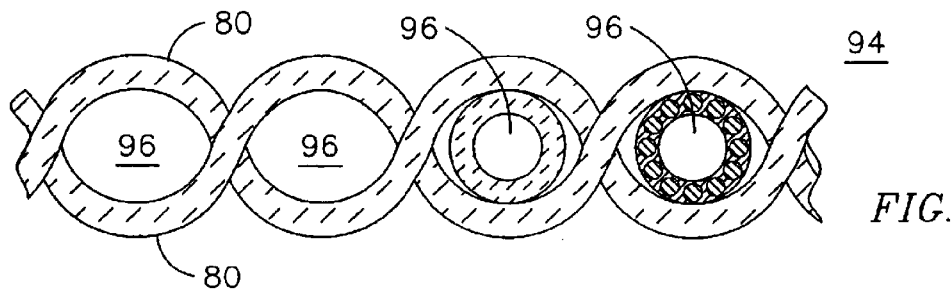
FIG. 5B is the woven fiber structure of FIG. 5A after the fugitive material has been removed, leaving a plurality of cooling passages through the fiber.

Reinforced cooling channels may further be incorporated into a three dimensional weaved fiber architecture using the processes described above. FIGS. 5A and 5B illustrate a process for forming such a weaved fiber architecture. FIG. 5A is a partial cross-sectional view of a 3-D weaved fabric showing the details of a weaving pattern which uses a fugitive material as the pins around which fibers 80 are weaved to define the weaving pattern. Prior art fabrics are normally wound around metal pins, which are then replaced with filler fibers. The fibers 80 which are used to weave 3-D fiber structure 81 may be any of the ceramic fibers discussed above, and the fugitive material may be any of the fugitive materials described above. The pins of the present invention may take any of a variety of forms, four of which are illustrated together in FIGS. 5A and 5B. A first embodiment uses a solid, non-reinforced fugitive material pin 82. A second embodiment uses a hollow, non-reinforced fugitive material pin 84. A third embodiment uses a fugitive material rod 86 that is wrapped with a layer of fibrous ceramic material 88, wherein the fibrous ceramic material 88 is generally oriented around the circumference of a longitudinal axis of the rod 86. A fourth embodiment also uses a reinforced fugitive material rod 90, but the reinforcing fibers 92 are wrapped in a direction generally parallel to the longitudinal axis of the rod 90. One may appreciate that by wrapping the fibers around the rod at any angle between circumferential (0 degrees) and longitudinal (90 degrees), for example at 45 degrees from parallel to the axis of the rod, a generally spiral configuration may be achieved. The fugitive material 80, 84, 86, 90 remains in place until an intermediate stage of processing, after matrix infiltration but before final firing, then are removed prior to final firing to provide 3-D fiber structure 94 having integral cooling channels 96 as illustrated in FIG. 5B.

Figure 6:
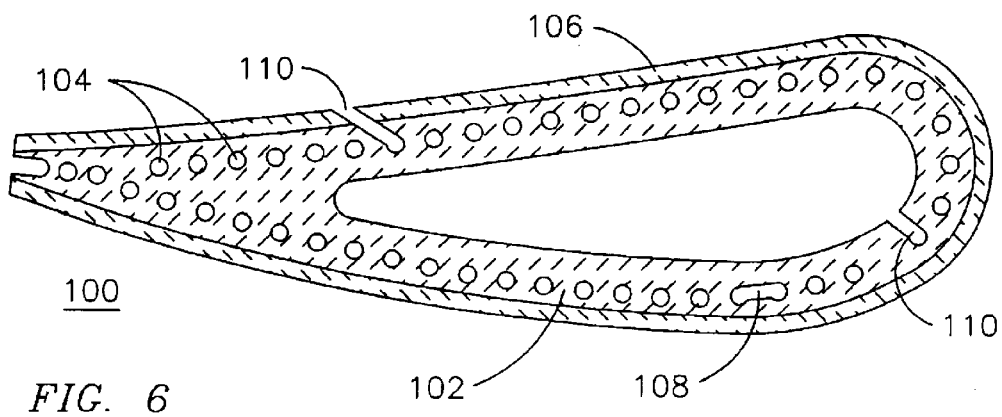
FIG. 6 is a cross-sectional view of an airfoil member formed of a CMC material having integral cooling channels formed therein and covered with a ceramic thermal barrier coating material.

FIG. 6 is a cross-sectional view of an airfoil member 100 as may be used in al turbine portion of a gas turbine-generator machine. The airfoil member 100 includes a ceramic matrix composite core member 102 having a plurality of cooling channels 104 formed therein in a manner as described above. The CMC core member 102 is illustrated as being covered with a layer of a ceramic thermal barrier coating material 106 to provide additional temperature protection for very high temperature applications. In some applications the TBC material 106 may not be required, and in fact, the present invention may obviate the need for such an insulating layer. Such thermal barrier coating materials 106 and methods for applying such to a CMC substrate 102 are known in the art. Non-limiting examples of thermal barrier coatings for this application include plasma sprayed $ZrO_2$, mullite, $Al_2O_3$, YSZ, friable-grade insulation and fibrous insulating materials. Cooling fluid may be directed through the cooling channels 104 in order to remove heat from the structure and to provide an increased temperature drop across the thickness of the CMC member 102 than would otherwise be achieved with back-side cooling only. Alternatively, it may be possible to achieve a desired temperature drop using less cooling air. Interconnections 108 between channels 104 may be formed by introducing fugitive materials during the fabrication process in a manner similar to that used to form the cooling channels 104 themselves. Interconnection 108 may be used to form a serpentine flow path for the cooling fluid in order to further improve the efficiency of the cooling system. Interconnections 110 open to the exterior or interior of the structure 100 from a respective cooling channel 104 may be formed by machining or by other known material removal process.

Figure 7:
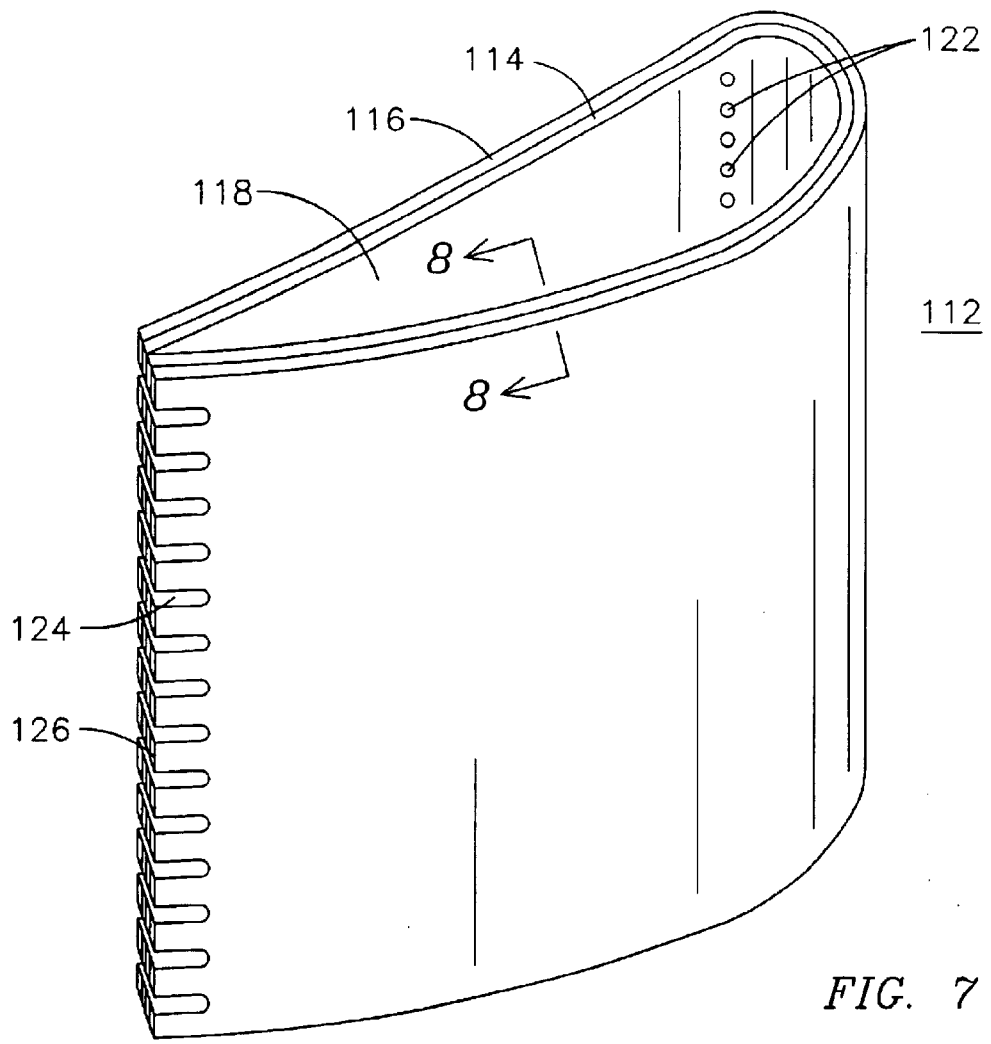
FIG. 7 is a perspective view of an airfoil member having a CMC core member containing integral cooling holes oriented along the chordal length of the airfoil.
Figure 8:
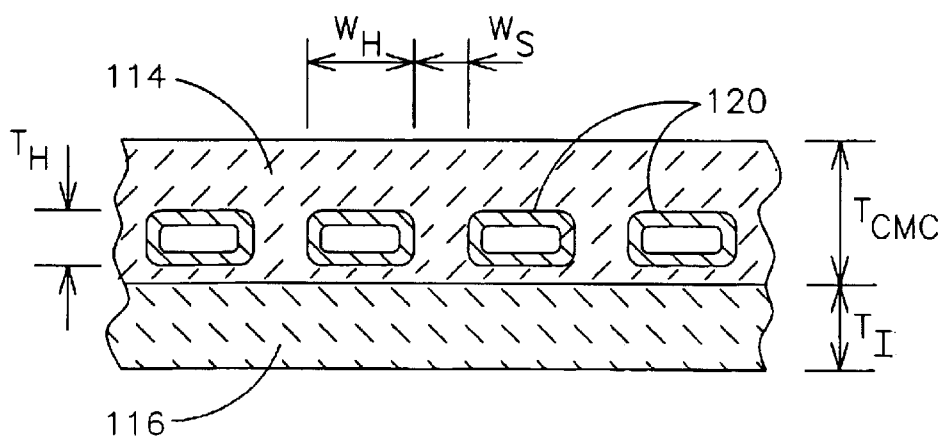
FIG. 8 is a partial cross-sectional view of the airfoil member of FIG. 7.

The integral cooling channels formed in accordance with the present invention may be oriented along the chordal length of an airfoil member 112, as illustrated in FIGS. 7 and 8. FIG. 7 is a perspective view of an airfoil member formed of a CMC inner core member 114 and an outer coating of a ceramic thermal barrier coating 116. Cooling fluid may be introduced into the hollow central volume 118 of the inner core member 114, whereupon it passes into a plurality of cooling passages 120 formed as an integral part of the inner core ceramic matrix composite material member 114, as best viewed in FIG. 8. Cooling passages 120 may be fiber reinforced in accordance with any of the embodiments described above. Reinforcing fibers may be oriented in a direction generally parallel to or circumferentially around the longitudinal axis of the cooling channel 120. Each cooling channel 120 may have an inlet end 122 opening into the central volume 118 for receiving a cooling fluid and an outlet end 124 opening to the exterior of the airfoil 112 along a trailing edge 126 for exhausting the cooling fluid to the heated side of the airfoil 112. In one embodiment, the thickness $T_{CMC}$ of the ceramic matrix composite inner core member 114 may be about 6 mm, the thickness $T_{TBC}$ of the thermal barrier coating 116 may be about 3 mm, the thickness dimension $T_H$ of the cooling passages 120 may be about 1.5 mm, and the widths $W_H$ and $W_S$ of the cooling passage 120 and the space between adjacent cooling passages 120 respectively may both be about 3 mm. Advantageously, the cooling passages 120 are formed within the thickness of the CMC inner core member 114 nearer the outer hot side surface of the airfoil member 112, for example at a distance of only about 1 mm from the interface of the CMC inner core member 114 and the thermal barrier coating 116. Thus, a flow of cooling fluid through the integral fiber-reinforced cooling channels 120 can remove heat and create a temperature drop across the thickness $T_{CMC}$ of the CMC inner core member 114 so that a safe operating temperature may be maintained at all locations within the structure at external operating temperatures in excess of 1,600° C. This is achieved without an unacceptable reduction in interlaminar strength by forming the cooling passages 120 to be fiber-reinforced in accordance with one of the methods and structures described above.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

We claim as our invention:

1. A multi-layer ceramic matrix composite structure comprising:
   a top layer of ceramic matrix composite material;
   a bottom layer of ceramic matrix composite material;
   a plurality of hollow ceramic matrix composite structures each defining a void; and
   an intermediate layer of ceramic matrix composite material disposed between the top layer and the bottom layer; the intermediate layer disposed alternately over and under adjacent hollow ceramic matrix composite structures to vertically displace adjacent voids.

2. A green body ceramic matrix composite structure comprising:
   a top layer of ceramic matrix impregnated ceramic fibers;
   a bottom layer of ceramic matrix impregnated ceramic fibers;
   a plurality of fiber-wrapped fugitive material structures extending in a longitudinal direction between the top layer and the bottom layer, each of the fiber-wrapped fugitive material structures comprising fugitive material wrapped with a layer of ceramic matrix impregnated fiber; and
   an intermediate layer of ceramic matrix impregnated ceramic fibers disposed between the top layer and the bottom layer; the intermediate layer being disposed alternately aver and under adjacent fiber-wrapped fugitive material structures to vertically displace adjacent fiber-wrapped fugitive material structures.

3. A ceramic matrix composite structure comprising:
   a multi-layer ceramic matrix composite material;
   a layer of ceramic thermal insulating material disposed on the multi-layer ceramic matrix composite material; and
   a cooling passage formed in the multi-layer ceramic matrix composite material, the cooling passage having a longitudinal axis extending in a direction parallel to a plane of a layer of the multi-layer ceramic matrix composite material, the cooling passage bounded by a layer of ceramic matrix composite material having fibers disposed around the longitudinal axis;
   wherein the cooling passage has an outlet end extending through the layer of ceramic thermal insulating material to deliver the cooling fluid to a hot side of the ceramic matrix composite structure.

4. A ceramic matrix composite structure comprising:
   a layer of ceramic matrix composite material having an inner surface defining a central volume;
   a layer of ceramic thermal insulating material disposed over an outer surface of the layer of ceramic matrix composite material, the layer of ceramic thermal insulating material defining an airfoil;
   a cooling passage extending from an inlet end at the inner surface of the layer of ceramic matrix composite material, through a portion of the layer of ceramic matrix composite material, through a thickness of the layer of ceramic thermal insulating material, to an outlet end at the outer surface of the layer of ceramic thermal insulating material for the passage of a cooling fluid from the central volume to exterior of the airfoil;
   the cooling passage defined and reinforced along at least a portion of its length by a reinforcing layer of ceramic matrix composite material embedded within the layer of ceramic matrix composite material.

5. The structure of claim 4, wherein the cooling passage outlet end is disposed along a trailing edge of the airfoil.

6. A ceramic matrix composite structure comprising:
   a layer of ceramic matrix composite material having a cooled side surface exposed to a flow of a cooling fluid and having a hat side surface opposed the cooled side surface;
   a cooling passage having a portion extending through the ceramic matrix composite material below the hot side surface, and
   the cooling passage further comprising an Inlet end extending across a thickness of the layer of ceramic matrix composite material to the cooled side surface for receiving the flow of cooling fluid.

7. The ceramic matrix composite structure of claim 6, further comprising:
   a layer of ceramic thermal insulating material disposed on the hot side surface;
   the cooling passage further comprising an outlet end extending through a thickness of the layer of ceramic thermal insulating material to the hot side surface for exhausting the flow of cooling fluid.

8. The ceramic matrix composite structure of claim 6, wherein the portion of the cooling passage extending through the ceramic matrix composite material below the hot side surface is reinforced by a layer of ceramic matrix composite material disposed around a longitudinal axis of the portion of the cooling passage.

9. A ceramic matrix composite structure comprising:
   a layer of ceramic matrix composite material having a hot side surface;
   a layer of ceramic thermal insulating material disposed on the hot side surface;
   a cooling passage having a portion extending through the ceramic matrix composite material below the hot side surface for directing a flow of cooling fluid, and
   the cooling passage further comprising an outlet end extending across a thickness of the layer of ceramic thermal insulating material to the hot side surface for exhausting the flow of cooling fluid.

10. The ceramic matrix composite structure of claim 9, wherein the portion of the cooling passage extending through the ceramic matrix composite material below the hot side surface is reinforced by a layer of ceramic matrix composite material disposed around a longitudinal axis of the portion of the cooling passage.

* * * * *